United States Patent
Arase et al.

(10) Patent No.: US 9,322,368 B2
(45) Date of Patent: Apr. 26, 2016

(54) CANISTER

(71) Applicant: MAHLE FILTER SYSTEMS JAPAN CORPORATION, Tokyo (JP)

(72) Inventors: Yuji Arase, Tokyo (JP); Junpei Omichi, Kawagoe (JP); Takashi Hasumi, Nishitokyo (JP); Koji Yamasaki, Saitama (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 0 days.

(21) Appl. No.: 14/580,946

(22) Filed: Dec. 23, 2014

(65) Prior Publication Data

US 2015/0184621 A1 Jul. 2, 2015

(30) Foreign Application Priority Data

Dec. 26, 2013 (JP) .................................. 2013-268409

(51) Int. Cl.
*B01D 53/02* (2006.01)
*F02M 25/08* (2006.01)
*B01D 53/04* (2006.01)

(52) U.S. Cl.
CPC ........ *F02M 25/0854* (2013.01); *B01D 53/0407* (2013.01); *B01D 2253/102* (2013.01); *B01D 2253/308* (2013.01); *B01D 2253/34* (2013.01); *B01D 2257/702* (2013.01); *B01D 2259/4516* (2013.01)

(58) Field of Classification Search
CPC ................. B01D 2253/102; B01D 2257/7022; B01D 53/0407; F02M 25/0854
See application file for complete search history.

(56) References Cited

U.S. PATENT DOCUMENTS

| 6,540,815 | B1 | 4/2003 | Hiltzik et al. | |
|---|---|---|---|---|
| RE38,844 | E | 10/2005 | Hiltzik et al. | |
| 8,015,965 | B2 | 9/2011 | Yamasaki | |
| 8,360,034 | B2 | 1/2013 | Yamasaki | |
| 8,443,786 | B2 | 5/2013 | Yamasaki | |
| 2007/0078056 | A1* | 4/2007 | Abe ....................... | B01D 53/02 502/416 |
| 2009/0013973 | A1 | 1/2009 | Yamasaki | |
| 2009/0209418 | A1* | 8/2009 | Watanabe .............. | B01J 20/103 502/405 |
| 2011/0077150 | A1 | 3/2011 | Yamasaki | |
| 2011/0077151 | A1 | 3/2011 | Yamasaki | |
| 2013/0269521 | A1* | 10/2013 | Nishita .............. | F02M 35/0218 95/91 |

FOREIGN PATENT DOCUMENTS

| JP | 2005-510654 A | 4/2005 |
|---|---|---|
| JP | 2009-19572 A | 1/2009 |

* cited by examiner

*Primary Examiner* — Christopher P Jones
(74) *Attorney, Agent, or Firm* — Foley & Lardner LLP

(57) ABSTRACT

To reduce size and weight of canister while improving adsorbing/desorbing performance by optimizing adsorbent that fills chamber located at air release side.

Adsorbent filling chambers 8, 9 located at air port 5 side, of a plurality of chambers 5~8 that are arranged in series along an air flow direction in case 2, is formed by macroscopic pore whose diameter is 50 nm or greater. The adsorbent has hollow cylindrical shape whose inside thickness is 0.6 to 1.5 mm and whose outside diameter is 4 to 6 mm or hollow spherical shape whose inside thickness is 0.6 to 1.5 mm and whose diameter is 4 to 6 mm. A ratio of volume of the macroscopic pore whose diameter is less than 500 nm to total volume of the macroscopic pore whose diameter is equal to or greater than 50 nm is within a range of 30 to 70%.

3 Claims, 6 Drawing Sheets

FIG.3

| DESIGNATION OF ACTIVATED CARBON | | ACTIVATED CARBON A-1 | ACTIVATED CARBON A-2 | ACTIVATED CARBON A-3 | ACTIVATED CARBON B-1 | ACTIVATED CARBON B-2 |
|---|---|---|---|---|---|---|
| ACTIVATED CARBON GRANULATING SHAPE | | CYLINDRICAL SHAPE | CYLINDRICAL AND CROSS-GRID SHAPE | CYLINDRICAL SHAPE | CYLINDRICAL SHAPE | CYLINDRICAL AND CROSS-GRID SHAPE |
| n-BUTANE EFFECTIVE ADSORPTION AMOUNT | g/L | 115 | 85 | 152 | 60 | 35 |
| DIFFERENCE OF EQUILIBRIUM ADSORPTION AMOUNT OF n-BUTANE CONCENTRATION BETWEEN VAPOR CONCENTRATIONS OF 5 vol% AND 50 vol% n-BUTANE | g/L | 52 | 42 | 80 | 27 | 16 |
| OUTSIDE DIAMETER OF ACTIVATED CARBON GRAIN | mm | 2 | 4.5 | 2 | 2 | 30 |
| THICKNESS OF ACTIVATED CARBON GRAIN | mm | 2.0 | 0.8 | 2.0 | 2.0 | 0.3 |
| RATIO OF VOLUME OF MACROSCOPIC PORE HAVING DIAMETER OF 50 nm ~ 500 nm TO TOTAL VOLUME OF MACROSCOPIC PORE WHOSE DIAMETER IS 50 nm ~ 100,000 nm | % | 27 | 54 | 52 | 20 | 82 |

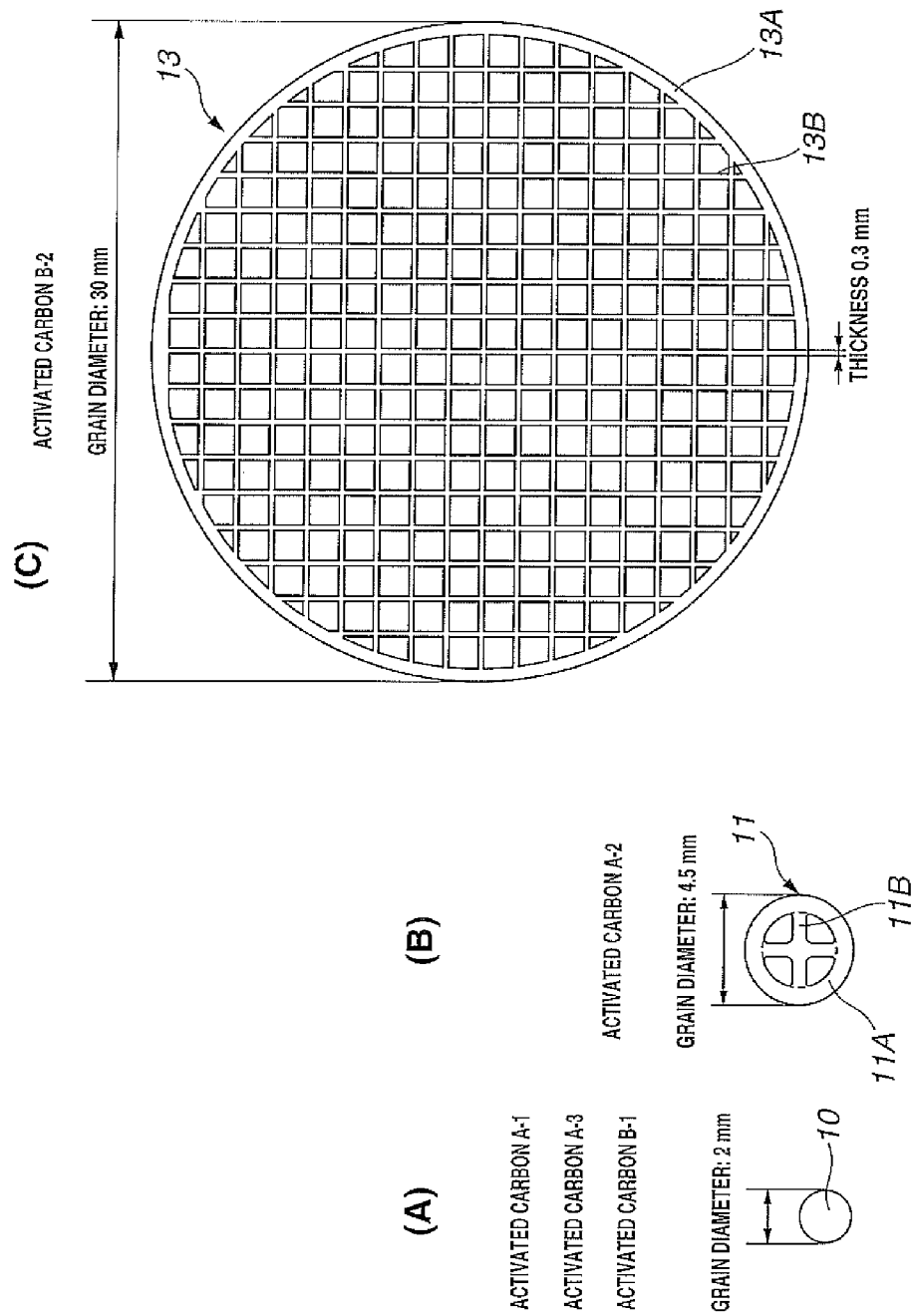

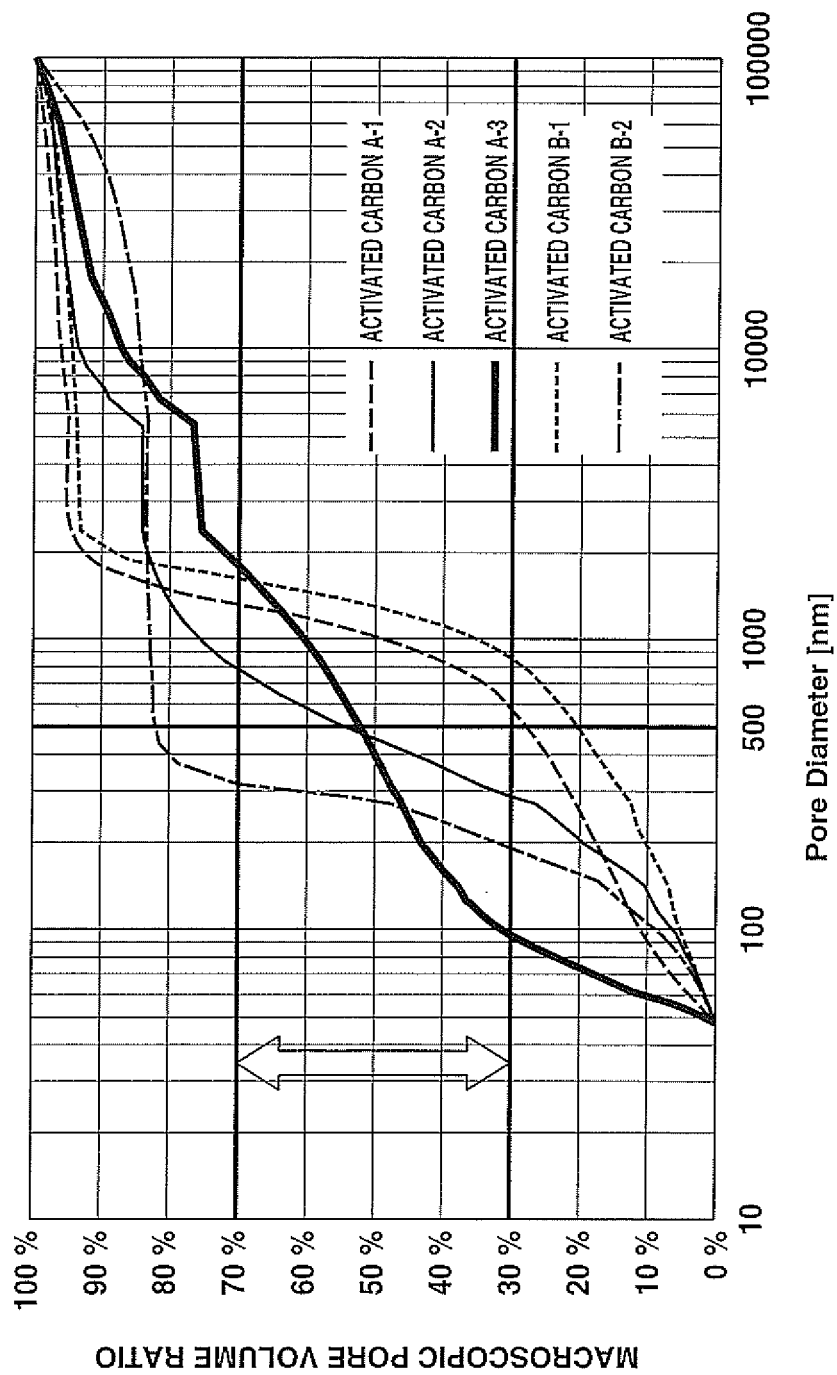

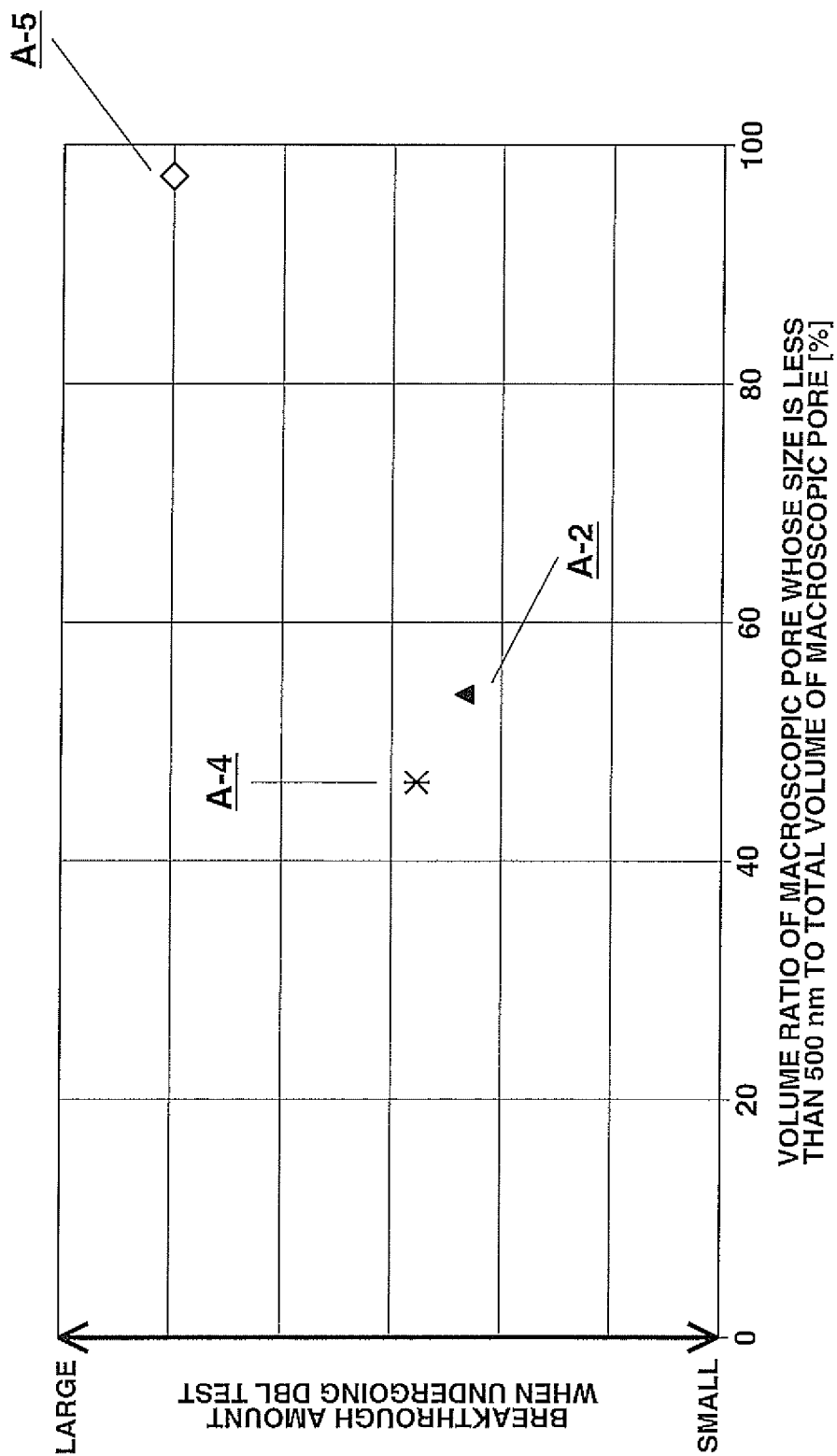

CANISTER

TECHNICAL FIELD

The present invention relates to a canister using, as an adsorbent, activated carbon having microscopic pore and macroscopic pore, used for, for instance, a treatment of fuel vapor of an internal combustion engine for a vehicle.

BACKGROUND ART

For instance, for an internal combustion engine of a vehicle, in order to prevent release of fuel vapor evaporated from a fuel tank of the vehicle into the outside, a canister that is capable of adsorbing and desorbing the fuel vapor is provided. As is known, an inside of a case of this canister is filled with an adsorbent. An air release opening is provided at one end side in a flow direction, and an inflow portion (a charge port) of the fuel vapor which communicates with the fuel tank and an outflow portion (a purge port) of the fuel vapor which communicates with an intake passage of the internal combustion engine are provided at the other end side in the flow direction. The fuel vapor that is generated after vehicle stop etc. is introduced into the canister from the fuel tank through the inflow portion, and is temporarily adsorbed by the adsorbent. Subsequently, during vehicle travelling, a flow of air where atmospheric air flows into the canister from the air release opening and flows out of the canister from the outflow portion by an intake cycle of the internal combustion engine occurs, and by this air flow, a fuel component adsorbed by the adsorbent is desorbed together with a fresh atmospheric air, and is introduced into a combustion chamber from the outflow portion through the intake passage of the internal combustion engine, then is burnt in the combustion chamber.

To efficiently perform the adsorption and desorption in such a canister, for instance, Patent Document 1 discloses a canister in which a plurality of chambers filled with the adsorbent are arranged in series along the air flow direction in a case of the canister, and a chamber located at an air release side is filled with an adsorbent that has high heat capacity.

Further, in Patent Document 2, as a technique of greatly reducing a diurnal breathing loss emission (Diurnal Breathing Loss; DBL), the adsorbent filling the canister is classified into two kinds of activated carbons of an activated carbon (hereinafter called A-carbon) whose difference of an equilibrium adsorption amount of n-butane concentration between vapor concentrations of 5 vol % and 50 vol % n-butane is greater than 35 g n-butane/L and an activated carbon (hereinafter called B-carbon) whose difference is less than or equal to 35 g n-butane/L, then a chamber located at an inflow and outflow portion side is filled with an adsorbent using the A-carbon and a chamber located at an air release side is filled with an adsorbent using the B-carbon. In this manner, by disposing, at the air release side, the activated carbon whose difference of the equilibrium adsorption amount is small, i.e. by disposing, at the air release side, the B-carbon which, although an effective adsorption amount (a difference of the adsorption amount between at the adsorption and after the desorption) is small, has an excellent desorption performance, emission of the fuel vapor to the air release side is suppressed, and the diurnal breathing loss emission (DBL) is reduced.

CITATION LIST

Patent Document

[Patent Document 1]
Japanese Patent Application Publication No. 2009-19572

[Patent Document 2]
Japanese Patent Application Publication No. 2005-510654

SUMMARY OF THE INVENTION

Technical Problem

However, if the adsorbent using the B-carbon whose effective adsorption amount is small is disposed at the air release side as described above, a capacity (a volume) of the activated carbon required to ensure a predetermined effective adsorption amount is increased, and this causes a problem of increasing a size and a weight of the canister.

Therefore, an object of the present invention is to provide a new canister that has an excellent desorption performance and is capable of sufficiently reducing the diurnal breathing loss emission (DBL) even when disposing an adsorbent using an activated carbon whose effective adsorption amount is large at the air release side.

Technical Solution

A canister of the present invention comprises: a case; a plurality of chambers which are arranged in series along an air flow direction in the case and filled with an adsorbent; and an inflow portion and an outflow portion of fuel vapor which are provided at one end in the air flow direction in the case and an air release opening of the fuel vapor which is provided at the other end in the air flow direction in the case.

The adsorbent filling at least the chamber located at an air release opening side, of the plurality of chambers, has a macroscopic pore whose diameter is equal to or greater than 50 nm, which is obtained by adding a meltable core that disappears during baking to powdery activated carbon having a microscopic pore whose diameter is less than 50 nm together with a binder and molding and baking this mixture.

The adsorbent filling the chamber located at the air release opening side, has a hollow cylindrical shape whose inside thickness is 0.6 mm to 1.5 mm and whose outside diameter is 4 mm to 6 mm or a hollow spherical shape whose inside thickness is 0.6 mm to 1.5 mm and whose diameter is 4 mm to 6 mm. A ratio of volume of the macroscopic pore whose diameter is less than 500 nm to a total volume of the macroscopic pore whose diameter is equal to or greater than 50 nm is within a range of 30% to 70%. In other words, a ratio of volume of the macroscopic pore whose diameter is greater than 500 nm is within a range of 70% to 30%.

In this manner, in the present invention, since an outside size (an outside dimension) of the adsorbent filling the chamber located at the air release opening side of the canister is 4 mm to 6 mm which is relatively large, its flow resistance is small when the chamber is filled with the adsorbent. Further, since the adsorbent has the hollow shape, the thickness of each part is set to be relatively small as compared with the outside dimension. This therefore brings an excellent desorbing performance.

Inventors of the present invention focused attention on the size (the diameter) of the macroscopic pore of the adsorbent filling the chamber located at the air release opening side, and found effectiveness of the case where the ratio of volume of the macroscopic pore whose diameter is less than 500 nm is within the range of 30% to 70%. That is, by setting a pore structure so that the macroscopic pore is distributed with a reference or an average value (the mean) of the pore diameter (the pore size) being in the vicinity of 500 nm, both of the adsorbing and desorbing performances are improved while keeping the flow resistance to a low level which is important as the canister, by combination of the size and the shape (the hollow shape and its thickness) described above of the adsorbent.

According to the present invention, as a typical adsorbent, the adsorbent filling the chamber located at the air release opening side is an A-carbon whose difference of an equilibrium adsorption amount of n-butane concentration between vapor concentrations of 5 vol % and 50 vol % n-butane is greater than 35 g n-butane/L. By using such A-carbon having large effective adsorption amount, capacity and weight of the adsorbent are suppressed, and size reduction and weight reduction of the canister can be achieved. Even in a case where such A-carbon is used, by optimizing the size and the shape of the adsorbent and also the distribution of the size of the macroscopic pore, it is possible to ensure an adequate desorbing performance and sufficiently reduce the diurnal breathing loss emission (DBL).

Further, in a case of the canister in which four or more chambers are arranged in series along an air flow direction in the case, it is preferable that as the adsorbent filling the chamber located at a first position from an air release opening side and the chamber located at a second position from the air release opening side, of these four or more chambers, the adsorbent having the above size, shape and distribution of the size of the macroscopic pore fill these two chambers located at the first and second positions from the air release opening side. With this, it is possible to surely reduce the emission of the fuel vapor from the air release opening by these two chambers. The diurnal breathing loss emission (DBL) can therefore be reduced greatly.

Effects of the Invention

According to the present invention, the flow resistance is reduced by using the adsorbent having the large outside dimension, and the hollow-shaped adsorbent is used and thickness of each part is limited, and further, the macroscopic pore is distributed with the reference or the average value (the mean) of the pore diameter (the pore size) being in the vicinity of 500 nm. With this adsorbent and this distribution of the macroscopic pore, while improving both of the adsorbing and desorbing performances of the fuel vapor, it is possible to suppress the capacity of the adsorbent and provide a lightweight and compact canister.

BRIEF DESCRIPTION OF DRAWINGS

FIG. 3 is a table showing each data of five activated carbons used as the adsorbent.

FIGS. 4(A) to 4(C) are sectional views showing shapes of the five activated carbons of FIG. 3.

FIG. 5 is a graph showing distribution of a size of macroscopic pore of the five activated carbons of FIG. 3.

FIG. 7 is a graph showing breakthrough amounts of the three activated carbons of FIG. 6.

EMBODIMENTS FOR CARRYING OUT THE INVENTION

Figure 1:
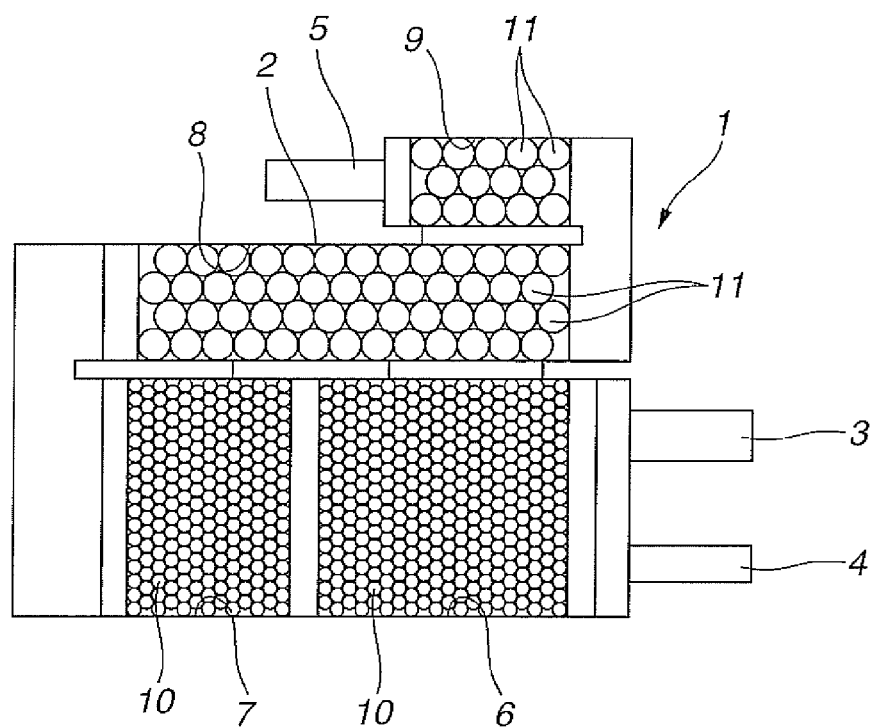
FIG. 1 is a sectional view showing an embodiment of a canister.

FIG. 1 shows an embodiment of a canister 1 according to the present invention. This canister 1 is a canister in which a flow passage is formed into a double U-turn shape by a synthetic resin case 2. A charge port 3 that is an inflow portion of fuel vapor and a purge port 4 that is an outflow portion of the fuel vapor are provided at one end, in a flow direction, of the case 2. An air port 5 that is an air release opening is provided at the other end, in the flow direction, of the case 2. The charge port 3 is connected to, for instance, a fuel tank (not shown) of a vehicle, while the purge port 4 is connected to, for instance, an intake system of an internal combustion engine.

In the case 2, as chambers to accommodate therein adsorbent, a first chamber 6, a second chamber 7, a third chamber 8 and a fourth chamber 9 are arranged in series in order from a side of the charge port 3 and the purge port 4. The first chamber 6 and the second chamber 7 are filled with an adsorbent 10 that is formed from an after-mentioned activated carbon A-1 or activated carbon A-3 which have a relatively small particle diameter. The third chamber 8 and the fourth chamber 9 are filled with an adsorbent 11 that is formed from an after-mentioned activated carbon A-2 which has a relatively large particle diameter. With this, reduction of a flow resistance especially at a part near or close to the air port 5 in the flow passage of the canister 1 is achieved, then a desorbing performance of the canister 1 as a whole is improved. The first chamber 6, the second chamber 7, the third chamber 8 and the fourth chamber 9 are each divided by, for instance, a porous plate or a filter which is permeable to the air.

The adsorbents 10 and 11 are adsorbents that have a macroscopic pore (a diameter of the pore is equal to or greater than 50 nm and is less than 100000 nm) serving as a path of the fuel vapor, in addition to a microscopic pore of the activated carbon itself (a diameter of the pore is equal to or greater than 2 nm and is less than 50 nm). For example, by adding a meltable core, which is a solid at room temperature and vaporizes, sublimates or decomposes at an after-mentioned baking temperature, to powdery activated carbon together with a binder and molding and baking this mixture, the adsorbents 10 and 11 having a predetermined large-sized granular shape or particle are obtained.

The activated carbon is, for instance, powdery activated carbon whose grain size (particle diameter) is 350 µm or less (42 mesh pass) obtained by crushing or pulverizing market-available coal-based or wood-based activated carbon. As the binder, powder or solid content of sol of powdery bentonite, knot clay, silica sol or alumina sol can be used. As the meltable core, powdery material (preferably, a grain size (a particle diameter) is 0.1 µm~1 mm), which is the solid at the room temperature and vaporizes, sublimates or decomposes at the baking temperature and also is less apt to dissolve in water that is medium at manufacturing, can be used. For example, it is subliming organic compound (e.g. naphthalene and para-dichlorobenzene), polymer (e.g. polyethylene) which has a high melting point and is apt to decompose, and fibrous material (φ0.1 µm~100 µm×fiber length 1 mm or shorter) (e.g. nylon, polyester and polypropylene).

These three of the activated carbon, the binder and the meltable core are mixed in a suitable mixing ratio with water added as necessary. Then, this mixture is molded into a cylindrical shape whose diameter is 4~6 mm and whose length is about 2~12 mm (preferably, the length is substantially same as the diameter) by extrusion. Further, this molded mixture is baked at 650° C.~1000° C. for 3~4 hours under an inert gas atmosphere using a rotary kiln etc., then the granular or particulate adsorbent 11 (the activated carbon A-2) is obtained.

The meltable core disappears (or melts away) during the baking, thereby forming the macroscopic pore (the diameter of the pore is equal to or greater than 50 nm and is less than 100000 nm) serving as the path of the fuel vapor, in addition to the microscopic pore of the activated carbon itself (the diameter of the pore is equal to or greater than 2 nm and is less than 50 nm). That is, the adsorbent 11 obtained has a so-called macroporous structure formed from the macroscopic pore and also has a so-called mesoporous structure formed from the microscopic pore that catches a molecule of the evaporated fuel.

Although a size of the macroscopic pore of the adsorbent 11 is determined mainly by the activated carbon used, it is controllable by a proportion etc. of the meltable core. In the present embodiment, pore whose diameter is less than 500 nm accounts for 30~70% of a volume of the macroscopic pore whose diameter is equal to or greater than 50 nm and is less than 100000 nm of the adsorbent 11. Here, distribution of the volume and the size of the macroscopic pore can be measured by, for instance, a method of mercury penetration provided by "ISO 15901-1".

The adsorbent 11 has a shape in cross section as shown in FIGS. 2(a) and 2(b). That is, it is a hollow cylindrical shape having a cylindrical wall 11A at an outer side and a cross-shaped radial wall 11B provided in the middle inside the cylindrical wall 11A. A thickness of each part is within a range from 0.6 mm to 1.5 mm (0.6 mm or more and 1.5 mm or less). For instance, an outside diameter D1 of the cylindrical wall 11A is 4.5 mm, and an inside diameter D2 of the cylindrical wall 11A is 3.0 mm. A thickness d of each part of the radial wall 11B is, for instance, 0.8 mm. A thickness (a thickness in a radial direction) of the cylindrical wall 11A is, for instance, 0.8 mm. Further, a length L in an axial direction is 4 mm. However, with regard to these sizes, variations occurring at an actual cutting process are great.

Here, an outside shape of the adsorbent 11 could be a spherical shape. Further, as the radial wall 11B, besides the cross-shape described above, various shapes such as a radial wall extending in three directions and an I-shaped (l-shaped) wall extending in two directions could be employed.

In view of the flow resistance of the canister 1, a large-sized adsorbent 11 is favorable for suppression of the flow resistance. However, if the thickness (in a case of a simple spherical shape, its diameter corresponds to the thickness) of the adsorbent 11 becomes thicker, the adsorbing/desorbing performance as the adsorbent, especially the desorbing performance, is deteriorated. Therefore, the adsorbent 11 filling the third chamber 8 and the fourth chamber 9 located at an air release side especially uses the hollow cylindrical-shaped adsorbent whose each part has the thin thickness.

Figure 2:
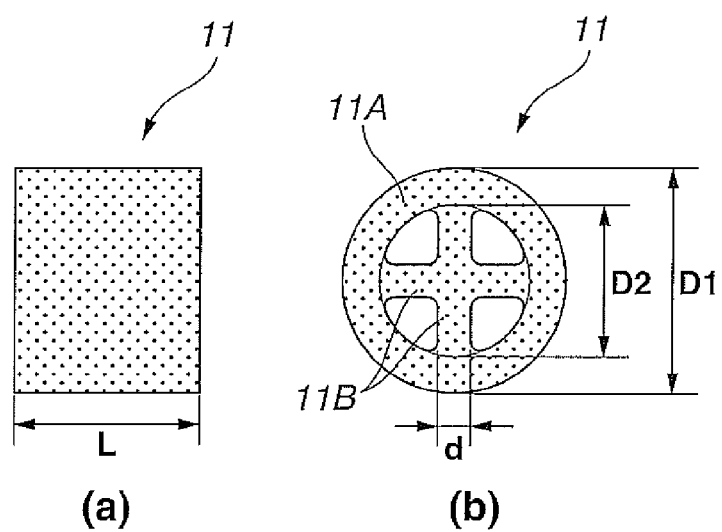
FIG. 2(a) is a side view of an adsorbent that fills a chamber located at an air release side.
FIG. 2(b) is a front view of this adsorbent.

FIG. 3 is a table showing each data of five activated carbons of activated carbons A-1, A-2, A-3, B-1 and B-2 used for the adsorbent. As explained above, in the present embodiment, the first chamber 6 and the second chamber 7 are filled with the adsorbent 10 using the activated carbon A-1 (or the activated carbon A-3), and the third chamber 8 and the fourth chamber 9 are filled with the adsorbent 11 using the activated carbon A-2. The activated carbons A-1, A-3 and B-1, as shown in FIG. 4(A), are molded into a non-hollow cylindrical shape for the adsorbent 10, and its outside diameter (its particle diameter) is 2 mm. The activated carbon A-2, as shown in FIG. 2 and FIG. 4(B), is molded into the hollow cylindrical shape having the cross-shaped radial wall 11B for the adsorbent 11. The activated carbon B-2, as shown in FIG. 4(C), is an activated carbon used for an adsorbent 13 that is molded into a large-sized honeycomb shape which is inserted and disposed in one chamber of the canister 1. This activated carbon has a hollow cylindrical shape having a cylindrical wall 13A at an outer side and a grid wall 13B arranged inside the cylindrical wall 13A. An inside of the cylindrical wall 13A is partitioned into a plurality of spaces extending in a longitudinal direction of the path by the grid wall 13B. An outside diameter of the cylindrical wall 13A is 30 mm, and a thickness of the grid wall 13B is 0.3 mm.

The activated carbons A-1, A-2 and A-3 are activated carbons whose difference of an equilibrium adsorption amount of n-butane concentration between vapor concentrations of 5 vol % and 50 vol % n-butane is greater than 35 g n-butane/L, and correspond to the above-mentioned A-carbon. The activated carbons B-1 and B-2 are activated carbons whose difference of an equilibrium adsorption amount of n-butane concentration between vapor concentrations of 5 vol % and 50 vol % n-butane is less than or equal to 35 g n-butane/L, and correspond to the above-mentioned B-carbon.

FIG. 5 is a graph showing distribution of a size (Pore Diameter) of the macroscopic pore of these five activated carbons. As shown in this FIG. 5, regarding the activated carbons A-2 and A-3 of the five activated carbons, a ratio of volume of the macroscopic pore having the diameter of 50~500 nm (i.e. less than 500 nm) to the total volume of the macroscopic pore whose diameter is 50~100000 nm (namely, the volume of the macroscopic pore whose size is less than 500 nm/the total volume of the macroscopic pore×100) is within a range of 30~70%. In other words, a pore structure whose size is greater than 500 nm accounts for 70~30% of the macroscopic pore in the volume ratio. More specifically, as shown in FIG. 3, the volume ratios of the macroscopic pore whose size is less than 500 nm of the activated carbons A-2 and A-3 are 54% and 52% respectively. That is, this is a pore structure having the distribution of the size of the macroscopic pore where a reference or an average value (the mean) of the pore diameter (the pore size) is in the vicinity of 500 nm.

On the other hand, regarding the activated carbons A-1 and B-1, the volume ratios of the macroscopic pore whose size is less than 500 nm to the total volume of the macroscopic pore are 27% and 20% respectively, which are lower than 30%. This is a pore structure having the distribution of the size of the macroscopic pore where on average, a pore whose size is much larger than 500 nm accounts for most of the total volume of the macroscopic pore. Further, regarding the activated carbon B-2, the volume ratio of the macroscopic pore whose size is less than 500 nm to the total volume of the macroscopic pore is 82%, which is higher than 70%. That is, this is a pore structure having the distribution of the size of the macroscopic pore where a pore whose size is smaller than 500 nm accounts for most of the total volume of the macroscopic pore.

Figure 6:
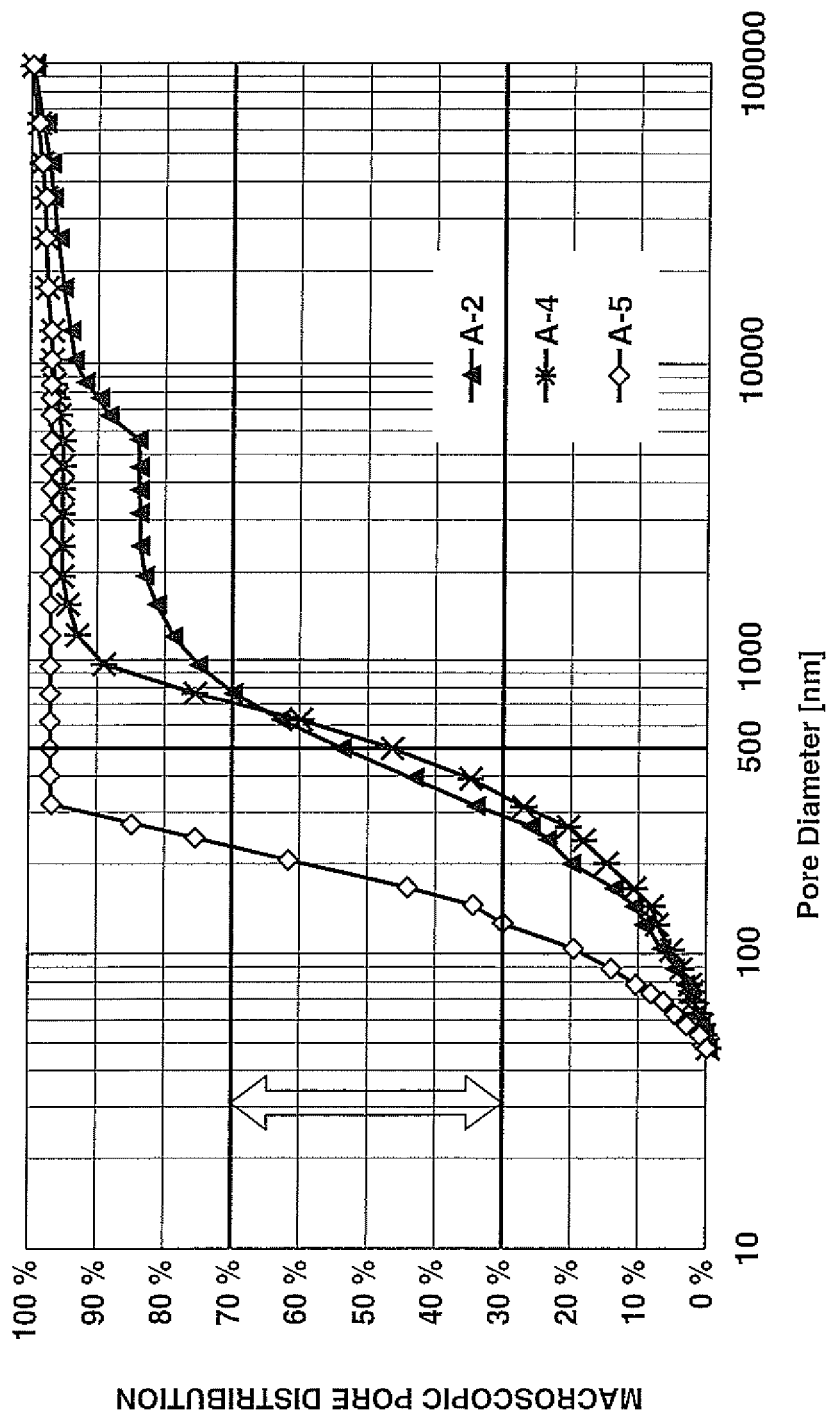
FIG. 6 is a graph showing distribution of a size of macroscopic pore of three activated carbons.

Referring to FIGS. 6 and 7, an activated carbon A-4 and an activated carbon A-5 are activated carbons which, although their shape and size are the same as those of the activated carbon A-2 used for the adsorbent 11 filling the air release side chambers 8 and 9 of the present embodiment, have different distribution of the size of the macroscopic pore. Particularly, while the volume ratios of the macroscopic pore whose size is less than 500 nm to the total volume of the macroscopic pore, of the activated carbon A-2 used in the present embodiment and the activated carbon A-4, are 54% and 47%, the volume ratio of the activated carbon A-5 exceeds 90%.

FIG. 7 is a profile showing breakthrough amounts of these activated carbons of A-2, A-4 and A-5 by a DBL test. In the graph, as a value on a vertical axis becomes greater, the breakthrough amount becomes larger, which indicates low (or poor) desorbing performance. As shown in FIG. 7, it was confirmed or verified that, regarding the activated carbons A-2 and A-4 whose volume ratios of the macroscopic pore whose size is less than 500 nm to the total volume of the macroscopic pore are 30-70%, the breakthrough amounts are sufficiently suppressed and activated carbons A-2 and A-4 have an excellent desorbing performance, as compared to the activated carbon A-5 whose volume ratio exceeds 90%.

Here, although experimental data is not shown in the profile, it was also confirmed that, regarding the activated carbon whose volume ratio of the macroscopic pore whose size is less than 500 nm to the total volume of the macroscopic pore is 30-70%, this activated carbon has a rather excellent desorbing performance, as compared to the activated carbon whose volume ratio is less than 30%.

As explained above, in the present embodiment, as the adsorbent (the activated carbon A-2) filling the third chamber 8 and the fourth chamber 9 located at the air release side, by employing the relatively large-sized hollow cylindrical shape or spherical shape in the outside, whose outside diameter is 4~6 mm, it is possible to reduce the flow resistance while securing strength of the adsorbent. Further, by combining the activated carbon whose volume ratio of the macroscopic pore whose size is less than 500 nm is 30~70%, namely, by combining the pore structure having the distribution of the size of the macroscopic pore where the reference of the pore diameter (the pore size) is in the vicinity of 500 nm, it is possible to greatly improve the desorbing performance.

Since the desorbing performance is improved in this manner, this allows the use of the A-carbon such as the activated carbon A-2 whose difference of the equilibrium adsorption amount is large and whose effective adsorption amount is large. It is therefore possible to suppress the capacity of the activated carbon, achieve a compact canister 1 and reduce the weight of the canister 1 while ensuring desired adsorbing/desorbing performance.

In particular, in the canister 1 in which four or more chambers 6~9 are arranged in series along the air flow direction in the case 2 as explained in the present embodiment, regarding the adsorbent filling both of the fourth chamber 9 located at the first position from the air release side and the third chamber 8 located at the second position from the air release side, by employing the shape, the size and the volume ratio described above for this adsorbent, it is possible to surely reduce the emission of the fuel vapor from the air port 5 by these two chambers 9, 8. The diurnal breathing loss emission (DBL) can therefore be reduced greatly.

Although the present invention has been explained on the basis of the embodiment above, the present invention is not limited to the embodiment above and includes various modification or change. For instance, in the above embodiment, the inside of the canister is divided into four chambers. However, the inside of the canister could be divided into three chambers, then the chamber located at the air release side is filled with the above-explained adsorbent.

EXPLANATION OF REFERENCE

1 . . . canister
2 . . . case
3 . . . charge port (inflow portion)
4 . . . purge port (outflow portion)
5 . . . air port (air release opening)
6, 7, 8, 9 . . . chamber
10, 11 . . . adsorbent

The invention claimed is:

1. A canister comprising:
a case;
a plurality of chambers which are arranged in series along an air flow direction in the case and filled with an adsorbent; and
an inflow portion and an outflow portion of fuel vapor which are provided at one end in the air flow direction in the case and an air release opening of the fuel vapor which is provided at the other end in the air flow direction in the case, and
the adsorbent filling at least the chamber located at an air release opening side, of the plurality of chambers, having a macroscopic pore whose diameter is equal to or greater than 50 nm and is less than 100000 nm, which is obtained by adding a meltable core that disappears during baking to powdery activated carbon having a microscopic pore whose diameter is less than 50 nm together with a binder and molding and baking this mixture,
the adsorbent filling at least the chamber located at the air release opening side, having a hollow cylindrical shape whose inside thickness is 0.6 mm to 1.5 mm and whose outside diameter is 4 mm to 6 mm or a hollow spherical shape whose inside thickness is 0.6 mm to 1.5 mm and whose diameter is 4 mm to 6 mm, and
a ratio of volume of the macroscopic pore whose diameter is equal to or greater than 50 nm and is less than 500 nm to a total volume of the macroscopic pore whose diameter is equal to or greater than 50 nm and is less than 100000 nm being within a range of 30% to 70%.

2. The canister as claimed in claim 1, wherein
the adsorbent filling the chamber located at the air release opening side is an adsorbent whose difference of an equilibrium adsorption amount of n-butane concentration between vapor concentrations of 5 vol % and 50 vol % n-butane is greater than 35 g n-butane/L.

3. A canister comprising:
a case;
at least four chambers which are arranged in series along an air flow direction in the case and filled with an adsorbent; and
an inflow portion and an outflow portion of fuel vapor which are provided at one end in the air flow direction in the case and an air release opening of the fuel vapor which is provided at the other end in the air flow direction in the case, and
the adsorbent filling the chamber located at a first position from an air release opening side and the chamber located at a second position from the air release opening side, of the at least four chambers, having a macroscopic pore whose diameter is equal to or greater than 50 nm and is less than 100000 nm, which is obtained by adding a meltable core that disappears during baking to powdery activated carbon having a microscopic pore whose diameter is less than 50 nm together with a binder and molding and baking this mixture,
the adsorbent filling the chamber located at the first position from the air release opening side and the chamber located at the second position from the air release opening side, having a hollow cylindrical shape whose inside thickness is 0.6 mm to 1.5 mm and whose outside diameter is 4 mm to 6 mm or a hollow spherical shape whose inside thickness is 0.6 mm to 1.5 mm and whose diameter is 4 mm to 6 mm, and a ratio of volume of the macroscopic pore whose diameter is equal to or greater than 50 nm and is less than 500 nm to a total volume of the macroscopic pore whose diameter is equal to or greater than 50 nm and is less than 100000 nm being within a range of 30% to 70%.

* * * * *